United States Patent [19]

Anazawa et al.

[11] Patent Number: 5,446,101
[45] Date of Patent: Aug. 29, 1995

[54] VINYLIDENE CHLORIDE COPOLYMER COMPOSITION AND MONOLAYER FILM

[75] Inventors: Noboru Anazawa; Yoshitaka Shimoda, both of Nobeoka, Japan

[73] Assignee: Asahi Kasei Kogyo Kabushiki Kaisha, Osaka, Japan

[21] Appl. No.: 318,741

[22] Filed: Oct. 18, 1994

[30] Foreign Application Priority Data

Mar. 5, 1993 [JP] Japan .................................. 5-044723

[51] Int. Cl.⁶ ............................................. C08L 27/08
[52] U.S. Cl. .................................. 525/239; 525/207; 525/208; 525/221; 525/222; 525/227; 525/235; 525/238; 525/228; 525/214; 525/225
[58] Field of Search ................. 525/239, 227, 235, 228

[56] References Cited

U.S. PATENT DOCUMENTS 2,459,125  1/1949  Cheyney .
3,108,017  10/1963  Kelkheim .
3,275,716  9/1966  Wiggins .
3,287,446  11/1966  Koch .

FOREIGN PATENT DOCUMENTS 43-22662   9/1968  Japan .
54-148046  11/1979  Japan .
61-236848  10/1986  Japan .
63-122745  5/1988  Japan .

*Primary Examiner*—Carman J. Seccuro, Jr.
*Attorney, Agent, or Firm*—Armstrong, Westerman, Hattori, McLeland & Naughton

[57] ABSTRACT

A composite vinylidene chloride copolymer composition excellent in processability which comprises a vinylidene chloride copolymer A having a molecular weight of not less than 50,000 and not more than 300,000 and a vinylidene chloride copolymer B having a molecular weight of not less than 5,000 and not more than the smaller one of either 0.8 times the weight average molecular weight of the vinylidene chloride copolymer A or 80,000, and a monolayer film which comprises the composite vinylidene chloride copolymer composition and is excellent in various properties including barrier property, non-extractability by oily foods and high frequency sealability, and is suitable as a barrier packaging material and wrapping film used for ham, sausage and other like foods.

3 Claims, 2 Drawing Sheets

VINYLIDENE CHLORIDE COPOLYMER COMPOSITION AND MONOLAYER FILM

TECHNICAL FIELD

The present invention relates to a novel vinylidene chloride copolymer composition excellent in processability and to a monolayer film comprising the vinylidene chloride copolymer composition and excellent in barrier property, non-extractability, mechanical property and high-frequency sealability. This monolayer film can be mainly used as a packaging material and wrapping film which need good barrier property used for ham, sausage, cheese, daily dishes and various other foods. As a packaging material, the monolayer film is used mainly in two package types. In one type, the food is filled into a tubular film formed beforehand in accordance with the form of the food to be packaged and then both ends are tied with aluminum wire, etc. In the other type, flat film is converted by means of high frequency sealing into a tubular film which accords with the form of the food, and then filling of the food and tying of the ends with aluminum wire, etc. are carried out in automatic operation.

BACKGROUND ART

Film, sheets and containers produced from a vinylidene chloride copolymer composition are excellent in oxygen impermeability, moisture resistance, transparency, chemical resistance, oil resistance, adhesiveness and heat shrinkage, and further is excellent from the viewpoint of food hygiene, so that they are in use for a vast variety of food packaging materials and wrapping films.

However, since vinylidene chloride-based polymers are poor in heat stability, it was indispensable in the previous production of these films, sheets and containers to add several percents of a liquid plasticizer to the polymer in order to prevent thermal decomposition caused by frictional heat at the time of processing. The addition of a liquid plasticizer, however, causes deterioration of the barrier property, which is the most eminent feature of vinylidene chloride-based polymers, and at the same time inevitably increases the amount of plasticizer extracted by oily foods. Though the thermal decomposition due to frictional heat at the time of processing can be prevented even when scarcely any liquid plasticizer is added if the molecular weight of the polymer is extremely lowered, the resulting film has a very low mechanical strength and cannot be used in practice.

Further, for obtaining a vinylidene chloride copolymer composition which can be processed with addition of no, or a very small amount of, liquid plasticizer, there are known a process which comprises blending a vinylidene chloride-based polymer with a polymer other than vinylidene chloride-based polymers which has a low softening temperature and low melt viscosity, as disclosed in Japanese Patent Kokai (Laid-open) No. 53-16753, and a process which comprises internal plasticization of a vinylidene chloride-based polymer by copolymerizing an acrylic ester with the vinylidene chloride-based polymer to lower the glass transition temperature, as disclosed in Japanese Patent Kokai (Laid-open) No. 04-72314. However, monolayer films obtained by these processes are all unsatisfactory from the viewpoint of preventing the deterioration of barrier property.

Further, as disclosed in Japanese Patent Kokai (Laid-open) No. 55-156,058, a multi-layer film has been proposed which comprises a barrier property-imparting layer obtained from a vinylidene chloride copolymer composition having a low molecular weight and containing only a small amount of liquid plasticizer, and a mechanical strength imparting layer obtained from a vinylidene chloride copolymer composition having a high molecular weight and containing a large amount of liquid plasticizer. In this film, however, the barrier property-imparting layer has a low mechanical strength, and the cost of processing equipment is high, so that the film is not economically advantageous.

DISCLOSURE OF THE INVENTION

The object of the present invention is to provide a vinylidene chloride copolymer composition having excellent processability with addition of no liquid plasticizer or addition of a much smaller amount of a liquid plasticizer than in the prior art, and a monolayer film comprising the vinylidene chloride copolymer composition which is quite excellent in barrier property, non-extractability of plasticizer, etc. by oily foods (hereinafter sometimes simply referred to as non-extractability), mechanical property and high frequency sealability. The term "high frequency sealability" used herein means that when a package filled with ham, sausage and other foods is heat-sterilized the high frequency-sealed part is not peeled off under the influence of heat and oil contained in the food.

The present inventors have made extensive study to obtain a vinylidene chloride copolymer composition having excellent processability with addition of no liquid plasticizer or addition of a much smaller amount of a liquid plasticizer than in the prior art, and a monolayer film which comprises the vinylidene chloride copolymer composition and is quite excellent in barrier property, non-extractability of plasticizer by oily foods, mechanical property and high-frequency sealability (sealability with a high-frequency sealer). As the result, the inventors have found that a specific composite vinylidene chloride copolymer composition and a monolayer film obtained therefrom can attain the above-mentioned object, and thus accomplished the present invention.

Thus, according to the present invention, there are provided a composite vinylidene chloride copolymer composition which comprises a vinylidene chloride copolymer A having a vinylidene chloride content of not less than 50% by weight and not more than 99% by weight and a weight average molecular weight of not less than 50,000 and not more than 300,000 as determined by gel permeation chromatography and a vinylidene chloride copolymer B having a vinylidene chloride content of not less than 50% by weight and not more than 99% by weight and a weight average molecular weight of not less than 5000 and not more than the smaller one of either 0.8 times the weight average molecular weight of the vinylidene chloride copolymer A or 80,000 as determined by gel permeation chromatography, and which contains the copolymer composition A in an amount of not less than 50% by weight and not more than 98% by weight, and a monolayer film comprising the composite copolymer composition.

BRIEF DESCRIPTION OF THE DRAWING

In FIG. 2, polymer A denotes a representative vinylidene chloride copolymer which has a weight average molecular weight (Mw) of 148,000, number average molecular weight (Mn) of 51,000, and Mw/Mn ratio of 2.9; polymer B denotes a representative vinylidene chloride copolymer which has a weight average molecular weight (Mw) of 46,000, number average molecular weight (Mn) of 22,000, and Mw/Mn ratio of 2.1; and A/B film denotes a film formed by processing a composite polymer composition obtained by blending the polymer A and the polymer B in a weight ratio of 80 to 20.

BEST MODE FOR CARRYING OUT THE INVENTION

The present invention is described in detail below.

The composite vinylidene chloride copolymer composition of the present invention comprises two kinds of vinylidene chloride-based polymers different in average molecular weight, the polymer A having a larger average molecular weight being used as a mechanical strength imparting component and a high frequency sealability imparting component and the polymer B having a smaller average molecular weight being used as a plasticizer component that works at the time of processing. At the time of processing, in contrast with prior vinylidene chloride copolymer compositions, the composition of the present invention requires no or virtually no addition of a liquid plasticizer, so that the problem of lowering of barrier property and increase of the amount of plasticizer etc. extracted from the polymer by oily foods in the monolayer film obtained by processing prior compositions can be obviated.

Figure 1:
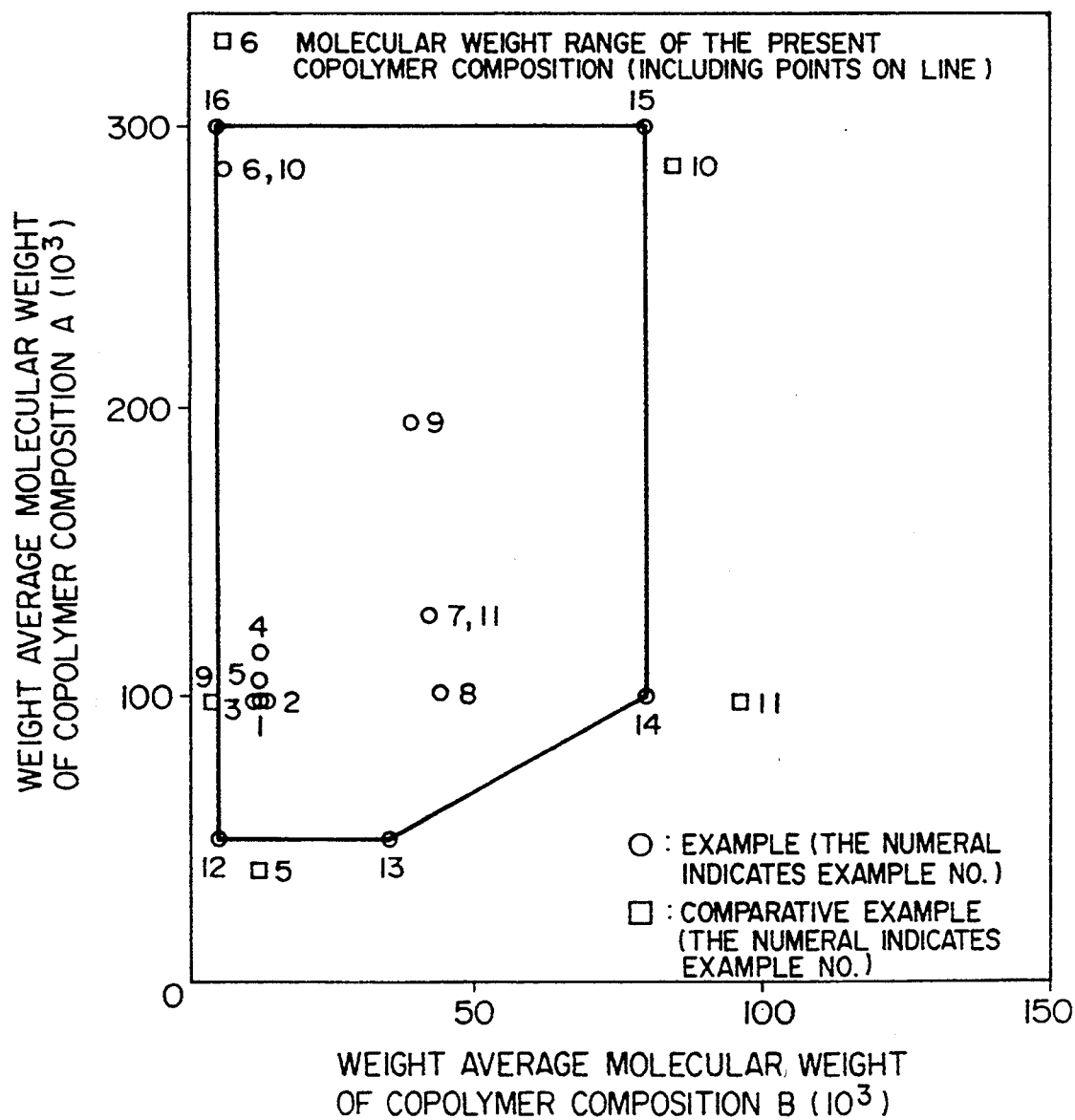
FIG. 1 is a graph showing the molecular weight range of the composite vinylidene chloride copolymer composition of the present invention.

FIG. 1 shows the molecular weight range of the composite vinylidene chloride copolymer composition of the present invention. That is, in the relationship of the weight average molecular weight of the vinylidene chloride copolymer A (MwA) constituting the composite vinylidene chloride copolymer composition of the present invention versus the weight average molecular weight of the vinylidene chloride copolymer B (MwB), the domain enclosed by the straight lines (including the points on the straight lines) represents the molecular weight range of the vinylidene chloride copolymer composition of the present invention. In the composite vinylidene chloride copolymer composition of the present invention, it is necessary that both of the MwA and MwB mentioned above satisfy the following equations (1), (2) and (3):

$$50{,}000 \leq MwA \leq 300{,}000 \quad (1)$$

when $MwA \geq 100{,}000$ $$5{,}000 \leq MwB \leq 80{,}000 \quad (2)$$

when $MwA < 100{,}000$ $$5{,}000 \leq MwB \leq 0.8 \times MwA \quad (3)$$

Figure 2:
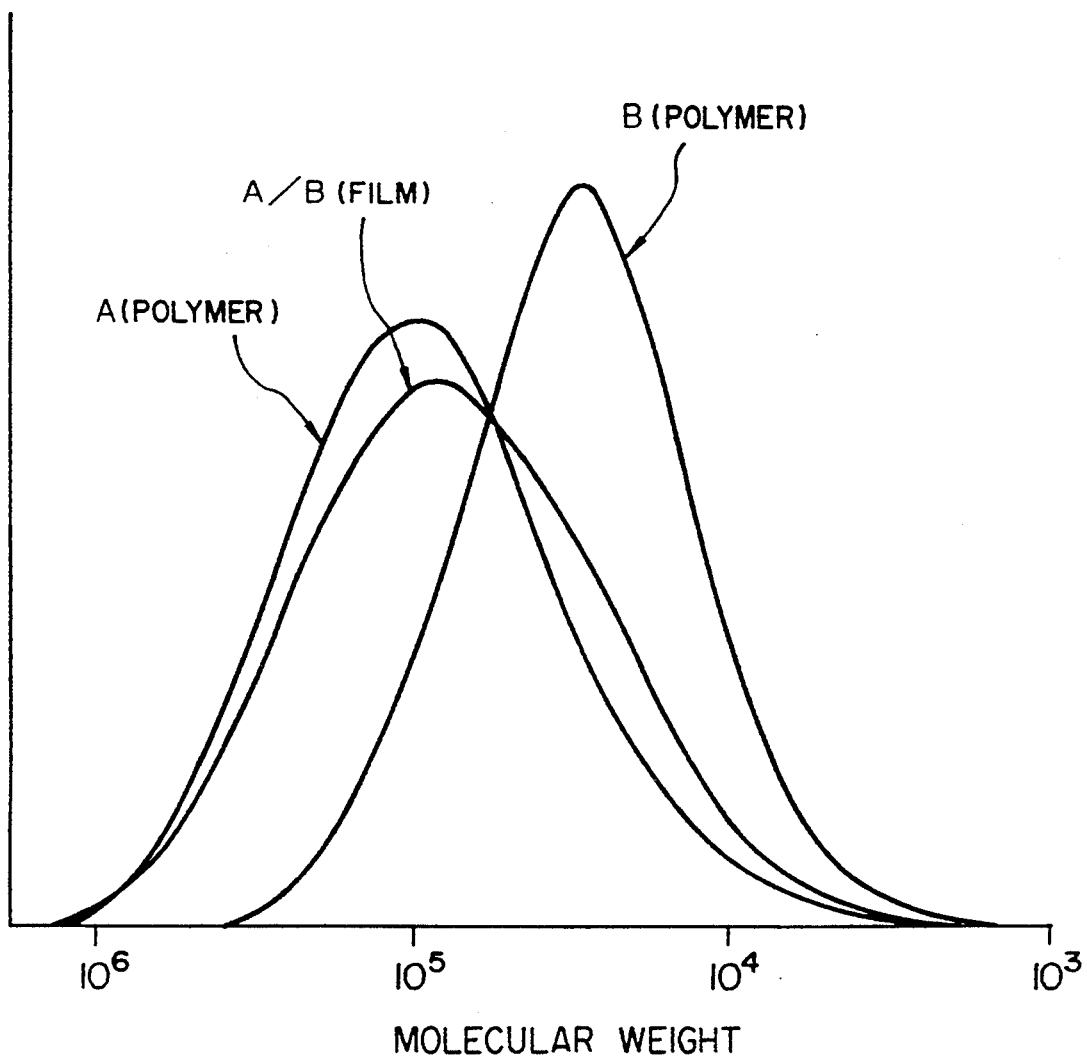
FIG. 2 is a graph showing the molecular weight distribution of a representative vinylidene chloride copolymer A and of a representative vinylidene chloride copolymer B and the molecular weight distribution of a film obtained by processing a composite vinylidene chloride copolymer composition obtained by blending the vinylidene chloride copolymer A and the vinylidene chloride copolymer B in a weight ratio of 80 to 20.

FIG. 2 shows respective molecular weight distributions of a vinylidene chloride copolymer A having a weight average molecular weight of 148,000 and a number average molecular weight of 51,000, a vinylidene chloride copolymer B having a weight average molecular weight of 46,000 and a number average molecular weight of 22,000, and a film formed by processing a composite vinylidene chloride copolymer composition obtained by blending the vinylidene chloride copolymer A and the vinylidene chloride copolymer B in a weight ratio of 80 to 20. The molecular weight distributions were determined by gel permeation chromatography using polystyrene as the standard.

In general, vinylidene chloride copolymer compositions undergo some change in molecular weight by processing, but the extent of the change is small. Accordingly, the molecular weight distribution of a film obtained by processing the composite vinylidene chloride copolymer composition of the present invention is, reflecting the molecular weight distribution of the starting copolymer composition, wider than that of a film obtained by processing a single copolymer composition.

The comonomers for vinylidene chloride used in obtaining the vinylidene chloride copolymer A and the vinylidene chloride copolymer B constituting the composite vinylidene chloride copolymer composition of the present invention may be one or more kinds of monomers copolymerizable with vinylidene chloride. Though the copolymerizable monomer is not particularly limited so long as it has high copolymerizability, industrially useful examples thereof include vinyl chloride; acrylic esters such as methyl acrylate, butyl acrylate, 2-ethylhexyl acrylate, etc.; methacrylic esters such as methyl methacrylate, butyl methacrylate, 2-ethylhexyl methacrylate, etc.; aliphatic carboxylic acid vinyl esters such as vinyl acetate, vinyl propionate, etc.; unsaturated aliphatic carboxylic acids such as acrylic acid, methacrylic acid, itaconic acid, crotonic acid, maleic acid, fumaric acid, maleic anhydride, etc.; half esters and diesters of unsaturated aliphatic carboxylic acids such as maleic acid, itaconic acid, etc.; olefins having a copolymerizable double bond, such as styrene, acrylonitrile, methacrylonitrile, acrylamide, methacrylamide, etc.; dienes having two copolymerizable double bonds, such as isoprene, butadiene, etc., and chlorinated products thereof, such as chlorobutadiene, etc.; monomers having a copolymerizable double bond and an epoxy group, such as glycidyl acrylate, glycidyl methacrylate, allyl glycidyl ether, etc.; and monomers having two copolymerizable double bonds in the molecule, such as divinylbenzene and acrylic or methacrylic acid esters of dihydric aliphatic alcohols. Particularly preferred among them are vinyl chloride, methyl acrylate, butyl acrylate and 2-ethylhexyl acrylate.

When the vinylidene chloride content in the vinylidene chloride copolymer A of the composite vinylidene chloride copolymer composition of the present invention is less than 50% by weight, the monolayer film obtained therefrom is not satisfactory in barrier property, whereas when the vinylidene chloride content is higher than 99% by weight, the composite vinylidene chloride copolymer composition is unsatisfactory in processability. The vinylidene chloride content in the vinylidene chloride copolymer A is particularly preferably in the range of not less than 80% by weight and not more than 97% by weight.

When the vinylidene chloride content in the vinylidene chloride copolymer B of the composite vinylidene chloride copolymer composition of the present invention is less than 50% by weight, the monolayer film obtained therefrom is unsatisfactory in barrier property, whereas when the vinylidene chloride content is higher than 99% by weight, the composite vinylidene chloride copolymer composition is unsatisfactory in processability. The vinylidene chloride content in the vinylidene chloride copolymer B is particularly preferably in the range of not less than 60% by weight and not more than 97% by weight.

When the weight average molecular weight of the vinylidene chloride copolymer A of the composite vinylidene chloride copolymer composition of the present invention is less than 50,000, the monolayer film obtained therefrom is unsatisfactory in mechanical strength and high frequency sealability, whereas when the weight average molecular weight is higher than 300,000, the composite vinylidene chloride copolymer composition is unsatisfactory in processability.

When the weight average molecular weight of the vinylidene chloride copolymer B of the composite vinylidene chloride copolymer composition of the present invention is less than 5,000, the monolayer film obtained therefrom is unsatisfactory in mechanical strength and high frequency sealability, whereas when the weight average molecular weight is larger than the smaller one of either 0.8 times the weight average molecular weight of the vinylidene chloride copolymer A or 80,000, the composite vinylidene chloride copolymer composition is unsatisfactory in processability.

When the content of the vinylidene chloride copolymer A in the composite vinylidene chloride copolymer composition of the present invention is less than 50% by weight, the monolayer film obtained therefrom is unsatisfactory in mechanical strength and high frequency sealability, whereas when the content is higher than 98% by weight, the composite vinylidene chloride copolymer composition is unsatisfactory in processability.

The vinylidene chloride copolymer A and the vinylidene chloride copolymer B of the composite vinylidene chloride copolymer composition of the present invention may be prepared by any of the methods of suspension polymerization, emulsion polymerization, solution polymerization, etc., but preferably by suspension polymerization.

The suspension polymerization may be carried out either by a direct suspension method wherein the monomer is added into water containing a suspending agent dissolved therein or by a suspension method wherein, as disclosed in Japanese Patent Kokai (Laid-open) No. 62-280207, water containing a suspending agent dissolved therein is added to the monomer and the resulting mixture is converted into a dispersion in which the monomer constitutes the discontinuous phase and water constitutes the continuous phase via a state of dispersion in which the monomer constitutes the continuous phase and water constitutes the discontinuous phase.

The oil soluble initiators used in suspension polymerization for producing the vinylidene chloride copolymer A and the vinylidene chloride copolymer B of the composite vinylidene chloride copolymer composition of the present invention may be, for example, organic peroxides, e.g., lauroyl peroxide, benzoyl peroxide, t-butyl peroxy-2-ethylhexanoate, t-butyl peroxyisobutyrate, t-butyl peroxypivalate, and diisopropyl peroxydicarbonate; and azobis compounds, e.g., azobisisobutyronitrile. The suspending agent used may be, for example, cellulose derivatives, such as methyl cellulose, ethylcellulose, hydroxypropylmethyl cellulose, etc., polyvinyl alcohol and partially hydrolyzed polyvinyl acetate.

The water-soluble initiators used in emulsion polymerization for producing the vinylidene chloride copolymer A and the vinylidene chloride copolymer B of the composite vinylidene chloride copolymer composition of the present invention may be, for example, inorganic peroxides, e.g., sodium persulfate, potassium persulfate, and ammonium persulfate; and redox systems of organic peroxides, e.g., t-butyl hydroperoxide, and formaldehyde sodium sulfoxide. The emulsifying agent used may be, for example, anionic surfactants such as sodium alkylsulfonate and sodium alkylbenzenesulfonate; and nonionic surfactants such as polyoxyethylene alkylphenyl ether, etc.

For producing the vinylidene chloride copolymer B in the composite vinylidene chloride copolymer composition of the present invention, chain transfer agents, such as trichloroethylene, dodecyl mercaptan, octyl mercaptan, thioglycolic acid, 2-ethylhexyl thioglycolate, etc. may be added and mixed at the time of polymerization.

The temperature of polymerization for producing the vinylidene chloride copolymer A and the vinylidene chloride copolymer B of the composite vinylidene chloride copolymer composition of the present invention is not particularly limited but is generally 20°-100° C., preferably 40°-90° C.

After completion of the above-mentioned polymerization, the reaction mixture is subjected to filtration, water washing, and drying according to necessity. When the reaction mixture is in the form of emulsion, the polymer is first salted out with aluminum sulfate, calcium chloride, or the like and then after-treated in a conventional manner to obtain powdery or granular polymer.

The blending of the vinylidene chloride copolymer A and the vinylidene chloride copolymer B may be carried out either in a dry state respectively in the form of powder or granule after drying or in the state of slurry before filtration, but when the vinylidene chloride copolymer B has a low molecular weight, the blending is preferably carried out in the state of slurry to prevent blocking of the polymer in drying. Further, the blend of the vinylidene chloride copolymer A and the vinylidene chloride copolymer B may also be prepared, without separately producing the copolymer A and the copolymer B and then blending the two, by a two-step polymerization wherein polymerization conditions are altered midway during the polymerization in one and the same polymerization vessel.

The composite vinylidene chloride copolymer composition thus obtained may be processed as such but, if necessary and desired, may be processed after adding various additives thereto. Examples of the additives include liquid plasticizers, added in a much smaller amount than in the prior art, such as dibutyl sebacate (DBS), acetyl tributyl citrate (ATBC), etc.; epoxidated compounds, such as epoxidated soybean oil, epoxidated linseed oil, bisphenol A diglycidyl ether, epoxidated polybutadiene, epoxidated octyl stearate, etc.; antioxidants, such as vitamin E, butylhydroxytoluene (BHT), thiodipropionic acid alkyl esters, etc.; heat stabilizing auxiliaries, such as sodium pyrophosphate, sodium tripolyphosphate, disodium ethylenediaminetetra-acetate (EDTA-2Na), magnesium oxide, etc.; various light stabilizers, various lubricants, various colorants, etc.

For obtaining a monolayer film from the composite vinylidene chloride copolymer composition of the present invention, mainly methods of extrusion are used, particularly the following two methods, namely the inflation method and the T-die method. In the inflation method, the copolymer composition is extruded from a circular die of a screw extruder, the tubular extruded product obtained is passed through the first cooling bath at a temperature below room temperature and then through the second preheating bath, and is expanded by blowing air thereinto between 2 sets of pinch rolls to form a bubble from the extruded product, whereby the desired film is obtained. In the T-die method, the composition is extruded from a T-die and then cooled to form the desired film. The film is preferably biaxially stretched.

The film thus formed may be subjected, if necessary, to post processing, such as corona discharge treatment, etc.

The monolayer film thus obtained is excellent in such properties as barrier property, non-extractability of plasticizers by oily foods, mechanical properties and high frequency sealability, and can be used as a packaging material and wrapping film required to have good barrier property used for ham, sausage, cheese, daily dishes and various other foods.

EXAMPLE

The present invention is described in more detail below with reference to Examples and Comparative Examples. In the Examples, the weight average molecular weight, oxygen permeability, water vapor permeability, olive oil extraction amount, tensile strength and apparent melt viscosity were determined by the following methods.

(1) Weight average molecular weight

This was determined by gel permeation chromatography using polystyrene as the standard and tetrahydrofuran as the solvent.

(2) Oxygen permeability

The permeability was determined according to JIS-K7126 with a film specimen 40 $\mu$m in thickness and the measured value was converted to a value per 1 $\mu$m thickness (unit: cc·$\parallel$ m/m$^2$·day·atm at 20° C.–100% RH).

(3) Water vapor permeability

The permeability was determined according to JIS-Z0208 (cup method) with a film specimen 40 $\mu$m in thickness and the measured value was converted to a value per 1 $\mu$m thickness (unit: g·$\mu$m/m$^2$·day at 40° C.–90% RH).

(4) Olive oil extraction amount

A film test piece 40 $\mu$m thick, 5 cm long and 5 cm wide was immersed in 100 cc of olive oil at 100° C. for 60 minutes, and the weight reduction of the film was taken as the extraction amount (unit: mg/dm$^2$).

(5) Tensile strength

A film test piece 40 $\mu$m thick, 5 cm long and 1 cm wide was subjected to a tensile test at a rate of 100 mm/min at 20° C. by using a tensile tester (TENSILON TYPE UTM-4L, mfd. by Toyo Baldwin) and the breaking strength was determined (unit: kg/mm$^2$).

(6) High frequency sealability

Two film test pieces each 40 $\mu$m thick, 10 cm long and 5 cm wide were placed one upon the other and subjected to high frequency sealing by using a high frequency welder (Type SP-50B, mfd. by Takano Denki Kogyo) under an electrode load of 3.2 kg in an output range of 2210 V to 3100 V. The electrode material was brass. Among the respective pairs of film pieces sealed in the above-mentioned output range, the one which has the highest seal strength was taken as the sample for evaluating high frequency sealability. The sealed part of the sample film was cut out in a width of 1 cm and, in a manner similar to T-peeling test, one end of the film was fixed with a clip, a weight of 16 g was hung at the other end, then the sample was placed in lard heated at 120° C., and the time elapsed till peeling of the sealed part was determined (unit: sec).

(7) Apparent melt viscosity

This was determined by using a Flow Tester (Type CFT-500, mfd. by Shimadzu Corp.) under conditions of a temperature of 180° C., load of 40 kgf, die size of 1 mm diameter and 2 mm length (unit: Poise).

Example 1

In a reactor equipped with a stirrer and having its inside wall glass-lined was placed 120 parts of deionized water containing 0.2 part of hydroxy-propylmethyl cellulose dissolved therein. After stirring was started, the inner atmosphere of the reaction system was replaced with nitrogen at 30° C., then a mixture of 90 parts of vinylidene chloride monomer (VDC), 10 parts of vinyl chloride monomer (VC) and 0.2 part of diisopropyl peroxydicarbonate was fed into the system, and the inner temperature of the reactor was raised to 45° C. to initiate polymerization. After 30 hours the temperature was lowered and the slurry was taken out. The water in the resulting slurry was separated with a centrifugal dehydrater, and the dehydrated product was dried in a hot air drier at 80° C. for 24 hours to obtain a powdery vinylidene chloride copolymer A (PVDC-A). The copolymer had a weight average molecular weight (Mw) of 98,000.

Separately, in the same reactor was placed 120 parts of deionized water containing 0.4 part of hydroxypropylmethyl cellulose dissolved therein. After stirring was started, the inner atmosphere of the reaction system was replaced with nitrogen at 30° C., then a mixture of 90 parts of vinylidene chloride monomer, 10 parts of vinyl chloride monomer, 1.0 part of t-butyl peroxy-2-ethylhexanoate and 7.0 parts of 2-ethylhexyl thioglycolate was fed into the system, and the inner temperature of the reactor was raised to 80° C. to initiate polymerization. After 10 hours, the temperature was lowered and the slurry was taken out. The water in the resulting slurry was separated with a centrifugal dehydrater, and the dehydrated product was dried in a hot air drier at 80° C. for 24 hours to obtain a powdery vinylidene chloride copolymer B (PVDC-B). The copolymer had a weight average molecular weight (Mw) of 12,000.

Then, the vinylidene chloride copolymer A and the vinylidene chloride copolymer B were blended in weight ratios of A to B of 90/10, 80/20 and 60/40 to obtain various composite vinylidene chloride copolymer compositions.

Then, 1.0 part of bisphenol A diglycidyl ether was compounded into 100 parts by weight of each of the composite vinylidene chloride copolymer compositions obtained above. The resulting mixture was fed to a conventional extruder, molten, extruded in the form of tube, then supercooled and inflated into a tubular film. The tubular film was flattened by pressing to obtain a monolayer film 40 μm in thickness. This composite vinylidene chloride copolymer composition was able to be extruded and formed into film without addition of a liquid plasticizer.

The oxygen permeability, water vapor permeability, olive oil extraction amount, tensile strength, high frequency sealability and apparent melt viscosity of the film obtained above were determined by the above-mentioned methods. The results obtained are shown in Table 1. It can be seen that the film is excellent in barrier property, non-extractability and high frequency sealability and has mechanical property comparable to that of conventional films.

Example 2

The procedures of Example 1 were repeated except that the monomers used in obtaining the vinylidene chloride copolymer B were changed into 90 parts by weight of vinylidene chloride and 10 parts by weight of 2-ethylhexyl acrylate (EHA), to obtain various composite vinylidene chloride copolymer compositions. The vinylidene chloride copolymer B in this case had a weight average molecular weight of 13,000.

Then, films were obtained in the same manner as in Example 1 and evaluated in the same manner. The composite vinylidene chloride copolymer compositions obtained above were able to be extruded and formed into film without addition of a liquid plasticizer. These films were excellent in barrier property, non-extractability and high frequency sealability and had mechanical property comparable to that of conventional films.

Example 3

The procedures of Example 1 were repeated except that the monomers used in obtaining the vinylidene chloride copolymer B were changed into 70 parts by weight of vinylidene chloride and 30 parts by weight of vinyl chloride and that the resulting vinylidene chloride copolymer A and the vinylidene chloride copolymer B were blended in the state of slurry, to obtain various composite vinylidene chloride copolymer compositions. The vinylidene chloride copolymer composition B in this case had a weight average molecular weight of 11,000.

Then, films were obtained in the same manner as in Example 1 and evaluated in the same manner. The results obtained are shown in Table 1. The composite vinylidene chloride copolymer compositions obtained above were able to be extruded and formed into film without addition of a liquid plasticizer. The films were excellent in barrier property, non-extractability and high frequency sealability and had mechanical properties comparable to those of conventional films.

Example 4

The procedures of Example 1 were repeated except that, in obtaining the vinylidene chloride copolymer composition A, the monomers were changed to 96 parts by weight of vinylidene chloride and 4 parts by weight of methyl acrylate (MA), 0.6 part by weight of t-butyl peroxy-2-ethylhexanoate was used as the polymerization initiator and the polymerization temperature and time were changed to 75° C. and 10 hours respectively, to obtain various composite vinylidene chloride copolymer compositions. The vinylidene chloride copolymer A in this case had a weight average molecular weight of 115,000.

Then, films were obtained in the same manner as in Example 1 and evaluated in the same manner. The results obtained are shown in Table 1. The composite vinylidene chloride copolymer compositions obtained above were able to be extruded and formed into film without addition of a liquid plasticizer. The films were excellent in barrier property, non-extractability and high frequency sealability and had mechanical property comparable to that of the conventional films.

Example 5

The procedures of Example 1 were repeated except that, in obtaining the vinylidene chloride copolymer A, the monomers used were changed to 95 parts by weight of vinylidene chloride and 5 parts by weight of 2-ethylhexyl acrylate, 0.6 part by weight of t-butyl peroxy-2-ethylhexanoate was used as the polymerization initiator, and the polymerization time and temperature were changed to 75° C. and 10 hours respectively, to obtain various composite vinylidene chloride copolymer compositions. The vinylidene chloride copolymer A in this case had a weight average molecular weight of 105,000.

Then, films were obtained in the same manner as in Example 1 and evaluated in the same manner. The composite vinylidene chloride copolymer compositions obtained above were able to be extruded and formed into film without addition of a liquid plasticizer. The films were excellent in barrier property, non-extractability and high frequency sealability and had mechanical properties comparable to those of conventional films.

Example 6

A vinylidene chloride copolymer A was obtained in the same manner as in Example 1 except for changing the amount of diisopropyl peroxydicarbonate to 0.05 part and the polymerization time to 60 hours. Separately, a vinylidene chloride copolymer B was obtained in the same manner as in Example 1 except for changing the amount of 2-ethylhexyl thioglycolate to 11.5 parts. The vinylidene chloride copolymer A and the vinylidene chloride copolymer B thus obtained had a weight average molecular weight of 285,000 and 60,000, respectively.

Then, a composite vinylidene chloride copolymer composition was obtained in the same manner as in Example 1, the blending ratio of the vinylidene chloride copolymer composition A to the vinylidene chloride copolymer composition B being 60 to 40 and the blending being carried out in a slurry state.

Further, a film was obtained in the same manner as in Example 1 and evaluated in the same manner. The results obtained are shown in Table 1. The composite vinylidene chloride copolymer composition obtained above was able to be extruded and formed into film without addition of a liquid plasticizer. The film was excellent in barrier property, non-extractability and high frequency sealability and had mechanical property comparable to that of conventional films.

Example 7

A vinylidene chloride copolymer A was obtained in the same manner as in Example 1 except that 80 parts by weight of vinylidene chloride and 20 parts by weight of vinyl chloride were used as the monomers, 0.12 part of diisopropyl peroxydicarbonate was used as the polymerization initiator and the polymerization time was changed to 60 hours. The vinylidene chloride copolymer A obtained had a weight average molecular weight of 128,000.

Separately, a vinylidene chloride copolymer B was obtained in the same manner as in Example 1 except that 80 parts by weight of vinylidene chloride and 20 parts by weight of vinyl chloride were used as the monomers, 0.4 part of t-butyl peroxyisobutyrate was used as the polymerization initiator, the polymerization temperature and time were changed to 80° C. and 16 hours respectively, and no chain transfer agent was used. The vinylidene chloride copolymer B obtained had a weight average molecular weight of 42,000.

Then, films were obtained in the same manner as in Example 1 and evaluated in the same manner. The results obtained are shown in Table 1. The composite vinylidene chloride copolymer compositions were able to be extruded and formed into film without addition of a liquid plasticizer. The films were excellent in barrier property, non-extractability and high frequency sealability and had mechanical properties comparable to those of conventional films.

Example 8

A vinylidene chloride copolymer A was obtained in the same manner as in Example 1 except that 95 parts by weight of vinylidene chloride and 5 parts by weight of methyl acrylate were used as the monomers, 0.7 part of t-butyl peroxy-2-ethylhexanoate was used as the polymerization initiator, and the polymerization temperature and time were changed into 75° C. and 10 hours, respectively. The vinylidene chloride copolymer A obtained had a weight average molecular weight of 101,000.

Separately, a vinylidene chloride copolymer B was obtained in the same manner as in Example 1 except that 95 parts by weight of vinylidene chloride and 5 parts by weight of methyl acrylate were used as the monomers, 0.6 part of t-butyl peroxyisobutyrate was used as the polymerization initiator, the polymerization temperature and time were changed to 80° C. and 12 hours, respectively, and no chain transfer agent was used. The vinylidene chloride copolymer composition B obtained had a weight average molecular weight of 44,000.

Then, films were prepared in the same manner as in Example 1 and evaluated in the same manner. The results obtained are shown in Table 1. The composite vinylidene chloride copolymer compositions in this case were able to be extruded and formed into film without addition of a liquid plasticizer. The films were excellent in barrier property, non-extractability and high frequency sealability and had mechanical properties comparable to those of conventional films.

Example 9

A vinylidene chloride copolymer A was obtained in the same manner as in Example 1 except that 80 parts by weight of vinylidene chloride and 20 parts by weight of vinyl chloride were used as the monomers, 0.2 part of diisopropyl peroxydicarbonate was used as the polymerization initiator, and the polymerization temperature and time were changed to 33° C. and 64 hours, respectively. The vinylidene chloride copolymer A obtained had a weight average molecular weight of 195,000.

Separately, a vinylidene chloride copolymer B was obtained in the same manner as in Example 1 except that 80 parts by weight of vinylidene chloride and 20 parts by weight of vinyl chloride were used as the monomers, 0.3 part of t-butyl peroxypivalate was used as the polymerization initiator, the polymerization temperature and time were changed to 65° C. and 16 hours respectively, and no chain transfer agent was used. The vinylidene chloride copolymer composition B obtained had a weight average molecular weight of 39,000.

Then, films were obtained in the same manner as in Example 1 and evaluated in the same manner. The results obtained are shown in Table 1. The composite vinylidene chloride copolymer compositions were able to be extruded and formed into film without addition of a liquid plasticizer. The films were excellent in barrier property, non-extractability and high frequency sealability and had mechanical properties comparable to those of conventional films.

Example 10

A blend of 100 parts of the vinylidene chloride copolymer A obtained in Example 6 and 0.5 part of dibutyl sebacate (DBS) was used in place of the vinylidene chloride copolymer A used in Example 1, and films were obtained in otherwise the same manner as in Example 1, and evaluated in the same manner. The results obtained are shown in Table 1. The composite vinylidene chloride copolymer compositions were able to be extruded and formed into film by addition of only a very small amount of a liquid plasticizer. The films were excellent in barrier property, non-extractability and high frequency sealability and had mechanical properties comparable to those of conventional films.

Example 11

In a 50-l reactor equipped with a stirrer was placed 120 parts of deionized water containing 0.2 part of hydroxypropylmethyl cellulose dissolved therein. After stirring was started, the atmosphere in the reaction system was replaced with nitrogen at 30° C. Thereafter, a mixture of 60 parts of vinylidene chloride monomer, 15 parts of vinyl chloride monomer and 0.09 part of diisopropyl peroxydicarbonate was fed into the reactor and the inner temperature of the reactor was raised to 45° C. to initiate polymerization. After 60 hours, the unreacted monomer was recovered, the temperature of the polymer slurry was lowered to 30° C., and a small amount of the slurry which would not substantially affect the subsequent reaction was taken out, then dehydrated and dried. Then, a mixture of 20 parts of vinylidene chloride monomer, 5 part of vinyl chloride and 0.1 part of t-butyl peroxyisobutyrate was fed into the reactor, and the inner temperature of the reactor was raised to 80° C. to resume the polymerization. After 16 hours, the temperature of the polymer slurry was lowered, and the slurry was taken out. Thereafter the procedures of Example 1 was repeated to obtain a composite vinylidene chloride copolymer composition.

The vinylidene chloride copolymer A obtained in the former stage reaction had a weight average molecular weight of 128,000, and the composite vinylidene chloride copolymer composition had a weight average molecular weight of 96,800. From these results, the vinylidene chloride copolymer B obtained in the latter stage reaction is estimated to have a weight average molecular weight of 42,000.

Then, 100 parts by weight of the composite vinylidene chloride copolymer composition obtained above was mixed with 1.0 part of bisphenol A diglycidyl ether, and a film of 40 μm thickness was prepared from the mixture in the same manner as in Example 1 and evaluated in the same manner. The results obtained are shown in Table 1. The composite vinylidene chloride copolymer composition in this case was able to be extruded and formed into film without addition of a liquid plasticizer. The film was excellent in barrier property, non-extractability and high frequency sealability and had mechanical properties comparable to those of conventional films.

Example 12

A vinylidene chloride copolymer A was obtained in the same manner as in Example 7 except that the amount of diisopropyl peroxydicarbonate was changed to 0.30 part and the polymerization time was changed to 40 hours. The vinylidene chloride copolymer A obtained had a weight average molecular weight of 50,000.

Separately, a vinylidene chloride copolymer B was obtained in the same manner as in Example 7 except that 5.0 parts by weight of 2-ethylhexyl thioglycolate was used as the chain transfer agent. The vinylidene chloride copolymer B obtained had a weight average molecular weight of 5,000.

Then, a composite vinylidene chloride copolymer composition was obtained in the same manner as in Example 1 except that the vinylidene chloride copolymer A and the vinylidene chloride copolymer B were blended in the state of slurry.

Further, films were obtained in the same manner as in Example 1 and evaluated in the same manner. The results obtained are shown in Table 1. The composite vinylidene chloride copolymer compositions were able to be extruded and formed into film without addition of a liquid plasticizer. The films were excellent in barrier property, non-extractability and high frequency sealability and had mechanical property comparable to that of conventional films.

Example 13

A vinylidene chloride copolymer A was obtained in the same manner as in Example 7 except that the amount of diisopropyl peroxydicarbonate was changed to 0.30 part and the polymerization time was changed to 40 hours. The vinylidene chloride copolymer A had a weight average molecular weight of 50,000.

Separately, a vinylidene chloride copolymer B was obtained in the same manner as in Example 7 except that the amount of t-butyl peroxyisobutyrate was changed to 0.6 part by weight and the polymerization time was changed to 12 hours. The vinylidene chloride copolymer B had a weight average molecular weight of 35,000.

Further, films were obtained in the same manner as in example 1 and evaluated in the same manner. The results obtained are shown in Table 1. The composite vinylidene chloride copolymer compositions were able to be extruded and formed into film without addition of a liquid plasticizer. The films were excellent in barrier property, non-extractability and high frequency sealability and had mechanical properties comparable to those of conventional films.

Example 14

A vinylidene chloride copolymer A was obtained in the same manner as in Example 7 except that the amount of diisopropyl peroxydicarbonate was changed to 0.20 part and the polymerization time was changed to 40 hours. The vinylidene chloride copolymer A had a weight average molecular weight of 100,000.

Separately, a vinylidene chloride copolymer B was obtained in the same manner as in Example 7 except that 0.24 part by weight of diisopropyl peroxydicarbonate was used as the polymerization initiator and the polymerization temperature and time were changed to 45° C. and 40 hours, respectively. The vinylidene chloride copolymer composition B had a weight average molecular weight of 80,000.

Then, films were obtained in the same manner as in Example 1 and evaluated in the same manner. The results obtained are shown in Table 1. The composite vinylidene chloride copolymer compositions were able to be extruded and formed into film without addition of a liquid plasticizer. The films were excellent in barrier property, non-extractability and high frequency sealability and had mechanical properties comparable to those of conventional films.

Example 15

A vinylidene chloride copolymer A was obtained in the same manner as in Example 7 except that the amount of diisopropyl peroxydicarbonate was changed to 0.05 part, and the polymerization temperature and time were changed to 40° C. and 90 hours, respectively. The vinylidene chloride copolymer A obtained had a weight average molecular weight of 300,000.

Separately, a vinylidene chloride copolymer B was obtained in the same manner as in Example 7 except that 0.24 part by weight of diisopropyl peroxydicarbonate was used as the polymerization initiator and the polymerization temperature and time were changed to 45° C. and 40 hours, respectively. The vinylidene chloride copolymer B obtained had a weight average molecular weight of 80,000.

The vinylidene chloride copolymer A was mixed with 0.5 part by weight of DBS, and then a composite vinylidene chloride copolymer composition was obtained in the same manner as in Example 1. In this case, the blending ratio of the vinylidene chloride copolymer A to the vinylidene chloride copolymer B was 60 to 40.

Further, a film was prepared in the same manner as in Example 1 and evaluated in the same manner. The results obtained are shown in Table 1. The composite vinylidene chloride copolymer composition was able to be extruded and formed into film by addition of a quite small amount of a liquid plasticizer. The film was excellent in barrier property, non-extractability and high frequency sealability and had mechanical properties comparable to those of conventional films.

Example 16

A vinylidene chloride copolymer A was obtained in the same manner as in Example 7 except that the amount of diisopropyl peroxydicarbonate was changed to 0.05 part and the polymerization temperature and time were changed to 40° C. and 90 hours, respectively. The vinylidene chloride copolymer A obtained had a weight average molecular weight of 300,000.

Separately, a vinylidene chloride copolymer B was obtained in the same manner as in Example 7 except that 5.0 parts by weight of 2-ethylhexyl thioglycolate was used as the chain transfer agent. The vinylidene chloride copolymer B obtained had a weight average molecular weight of 5,000.

Then, a composite vinylidene chloride copolymer composition was obtained in the same manner as in Example 1, except that the vinylidene chloride copolymer A and the vinylidene chloride copolymer B were blended in a ratio of 60 to 40 and in a slurry state.

Further, a film was obtained in the same manner as in Example 1 and evaluated in the same manner. The results obtained are shown in Table 1. The composite vinylidene chloride copolymer composition was able to be extruded and formed into film without addition of a liquid plasticizer. The film was excellent in barrier property, non-extractability and high frequency sealability and had mechanical properties comparable to those of conventional films.

Example 17

Each of the various composite vinylidene chloride copolymer compositions obtained in Example 7 was blended with 2.0 parts by weight of DBS, and the resulting blend was formed into film and evaluated in the same manner as in Example 1. The results obtained are shown in Table 1. The composite vinylidene chloride copolymer compositions were able to be extruded and formed into film without any problem. The films were excellent in barrier property, non-extractability and high frequency sealability and had mechanical properties comparable to those of conventional films.

Example 18

Each of the various composite vinylidene chloride copolymer compositions obtained in Example 7 was blended with 2.0 parts by weight of ATBC, and the resulting blend was formed into film and evaluated in the same manner as in Example 1. The results obtained are shown in Table 1. The composite vinylidene chloride copolymer compositions were able to be extruded and formed into film without any problem. The films were excellent in barrier property, non-extractability and high frequency sealability and had mechanical properties comparable to those of conventional films.

Comparative Example 1

A composite vinylidene chloride copolymer composition was obtained in the same manner as in Example 1 except that the vinylidene chloride copolymer A and the vinylidene chloride B were blended in a weight ratio of 99 to 1. The composite vinylidene chloride copolymer composition obtained had a high melt viscosity and was unable to be extruded into film. These results are shown in Table 1.

Comparative Example 2

A composite vinylidene chloride copolymer composition was obtained in the same manner as in Example 1 except that the vinylidene chloride copolymer A and the vinylidene chloride copolymer B were blended in a weight ratio of 40 to 60.

Then, a film was obtained in the same manner as in Example 1 and evaluated in the same manner. The results are shown in Table 1. The film was unsatisfactory in mechanical properties and high frequency sealability.

Comparative Example 3

A composite vinylidene chloride copolymer composition was obtained in the same manner as in Example 1 except that the monomers used in obtaining the vinylidene chloride copolymer A were changed to 99.5 parts by weight of vinylidene chloride and 0.5 part by weight of vinyl chloride, the blending ratio of the vinylidene chloride copolymer A to the vinylidene chloride copolymer B being 80 to 20. The vinylidene chloride copolymer A obtained in this case was insoluble in tetrahydrofuran and its molecular weight could not be determined. The composite vinylidene chloride copolymer composition had a high melt viscosity and was unable to be extruded into film. These results are shown in Table 1.

Comparative Example 4

A composite vinylidene chloride copolymer composition was obtained in the same manner as in Example 1 except that the monomers used in obtaining the vinylidene chloride copolymer A were changed to 40 parts by weight of vinylidene chloride and 60 parts by weight of vinyl chloride, provided that the blending ratio of the vinylidene chloride copolymer A to the vinylidene chloride copolymer B was 80 to 20. The vinylidene chloride copolymer A in this case had a weight average molecular weight of 85,000.

Then, a film was obtained in the same manner as in Example 1 and evaluated in the same manner. The results are shown in Table 1. The film was unsatisfactory in gas barrier property.

Comparative Example 5

A composite vinylidene chloride copolymer composition was obtained in the same manner as in Example 1 except that the amount of diisopropyl peroxydicarbonate used in obtaining the vinylidene chloride copolymer A was changed to 1.0 part, provided that the blending ratio of the vinylidene chloride copolymer A to the vinylidene chloride copolymer B was 80 to 20. The vinylidene chloride copolymer A in this case had a weight average molecular weight of 39,000.

Then, a film was obtained in the same manner as in Example 1 and evaluated in the same manner. The results obtained are shown in Table 1. The film was unsatisfactory in mechanical properties and high frequency sealability.

Comparative Example 6

A composite vinylidene chloride copolymer composition was obtained in the same manner as in Example 6 except that, in obtaining the vinylidene chloride A, the amount of diisopropyl peroxydicarbonate was changed to 0.02 part and the polymerization time was changed to 100 hours, provided that the blending ratio of the vinylidene chloride copolymer A to the vinylidene chloride copolymer B being 60 to 40. The vinylidene chloride copolymer A in this case had a weight average molecular weight of 330,000. The composite vinylidene chloride copolymer composition had a high melt viscosity and was unable to be extruded into film. These results are shown in Table 1.

Comparative Example 7

A composite vinylidene chloride copolymer composition was obtained in the same manner as in Example 1 except that the monomers used in obtaining the vinylidene chloride copolymer B were changed to 99.5 parts by weight of vinylidene chloride and 0.5 part by weight of vinyl chloride, provided that the blending ratio of the vinylidene chloride copolymer A to the vinylidene chloride copolymer B was 80 to 20. The vinylidene chloride copolymer B in this case was insoluble in tetrahydrofuran and its molecular weight could not be determined. The composite vinylidene chloride copolymer composition had a high melt viscosity and was unable to be extruded into film. These results are shown in Table 1.

Comparative Example 8

A composite vinylidene chloride copolymer composition was obtained in the same manner as in Example 1 except that the monomers used in obtaining the vinylidene chloride copolymer B were changed to 40 parts by weight of vinylidene chloride and 60 parts by weight of vinyl chloride, provided that the blending ratio of the vinylidene chloride copolymer A to the vinylidene chloride copolymer B was 80 to 20. The vinylidene chloride copolymer B in this case had a weight average molecular weight of 9,000.

Then, a film was obtained in the same manner as in Example 1 and evaluated in the same manner. The results obtained are shown in Table 1. The film was unsatisfactory in gas barrier property.

Comparative Example 9

A composite vinylidene chloride copolymer composition was obtained in the same manner as in Example 1 except that the amount of t-butyl peroxy-2-ethylhexanoate used in obtaining the vinylidene chloride copolymer B was changed to 2.5 parts, the blending ratio of the vinylidene chloride copolymer A to the vinylidene chloride copolymer B was 80 to 20 and the blending was carried out in a slurry state. The vinylidene chloride copolymer B in this case had a weight average molecular weight of 3,800.

Then, a film was obtained in the same manner as in Example 1 and evaluated in the same manner. The results obtained are shown in Table 1. The film was unsatisfactory in mechanical property and high frequency sealability.

Comparative Example 10

A vinylidene chloride copolymer A was obtained in the same manner as in Example 6. The vinylidene chloride copolymer A obtained had a weight average molecular weight of 285,000. Separately, a vinylidene chloride copolymer B was obtained in the same manner as in obtaining the vinylidene chloride copolymer A in Example 1 except that the amount of diisopropyl peroxydicarbonate used was changed to 0.3 part. The vinylidene chloride copolymer B in this case had a weight average molecular weight of 85,000.

The composite vinylidene chloride copolymer composition thus obtained had a high melt viscosity and was unable to be extruded into film. These results are shown in Table 1.

Comparative Example 11

A vinylidene chloride copolymer A was obtained in the same manner as in Example 1. The vinylidene chloride copolymer A obtained had a weight average molecular weight of 98,000.

Separately, a vinylidene chloride copolymer B was obtained in the same manner as in obtaining the vinylidene chloride copolymer A of Example 1 except that, in obtaining the vinylidene chloride copolymer B, 0.15 part by weight of diisopropyl peroxydicarbonate was used as the polymerization initiator. The vinylidene chloride copolymer B in this case had a weight average molecular weight of 96,000.

Further, a composite vinylidene chloride copolymer composition was obtained in the same manner as in Example 1, provided that the blending ratio of the vinylidene chloride copolymer A to the vinylidene chloride copolymer B was 80 to 20.

The composite vinylidene chloride copolymer composition obtained had a high melt viscosity and was unable to be extruded into film. These results are shown in Table 1.

Comparative Example 12

One hundred parts of the vinylidene chloride copolymer A obtained in Example 7 was blended with respectively 2 parts by weight, 4 parts by weight and 6 parts by weight of DBS. The product blended with 2 parts by weight had a high melt viscosity and was unable to be extruded into film.

The product blended with 4 parts by weight and the one blended with 6 parts by weight were formed into film in the same manner as in Example 1 and evaluated in the same manner. The results obtained are shown in Table 1. The films were unsatisfactory in barrier property and non-extractability.

Comparative Example 13

One hundred parts of the vinylidene chloride copolymer A obtained in Example 7 was blended with respectively 2 parts by weight, 4 parts by weight and 6 parts by weight of ATBC. The product blended with 2 parts by weight had a high melt viscosity and was unable to be extruded into film.

The product blended with 4 parts by weight and the one blended with 6 parts by weight were formed into film in the same manner as in Example 1 and evaluated in the same manner. The results are shown in Table 1. The films were unsatisfactory in barrier property and non-extractability.

TABLE 1

| Example No. | PVDC-A Charge composition (wt %) | Mw ($10^4$) | PVDC-B Charge composition (wt %) | Mw ($10^4$) | PVDC-A/PVDC-B Composite ratio (wt %) | Oxygen permeability (*) |
|---|---|---|---|---|---|---|
| Example 1 | VDC/VC 90/10 | 9.8 | VDC/VC 90/10 | 1.2 | 90/10 80/20 60/40 | 5 12 18 |
| Example 2 | VDC/VC 90/10 | 9.8 | VDC/EHA 90/10 | 1.3 | 90/10 80/20 60/40 | 8 12 18 |
| Example 3 | VDC/VC 90/10 | 9.8 | VDC/VC 70/30 | 1.1 | 80/20 | 7 14 |

TABLE 1-continued

| | | | | | 60/40 | 21 |
|---|---|---|---|---|---|---|
| Example 4 | VDC/MA 96/4 | 11.5 | VDC/VC 90/10 | 1.2 | 90/10 | 4 |
| | | | | | 80/20 | 6 |
| | | | | | 60/40 | 9 |
| Example 5 | VDC/EHA 95/5 | 10.5 | VDC/VC 90/10 | 1.2 | 90/10 | 4 |
| | | | | | 80/20 | 7 |
| | | | | | 60/40 | 8 |
| Example 6 | VDC/VC 90/10 | 28.5 | VDC/VC 90/10 | 0.6 | 60/40 | 18 |
| Example 7 | VDC/VC 80/20 | 12.8 | VDC/VC 80/20 | 4.2 | 90/10 | 8 |
| | | | | | 80/20 | 11 |
| | | | | | 60/40 | 12 |
| Example 8 | VDC/MA 95/5 | 10.1 | VDC/MA 95/5 | 4.4 | 90/10 | 6 |
| | | | | | 80/20 | 8 |
| | | | | | 60/40 | 10 |
| Example 9 | VDC/VC 80/20 | 19.5 | VDC/VC 80/20 | 3.9 | 90/10 | 7 |
| | | | | | 80/20 | 10 |
| | | | | | 60/40 | 13 |
| Example 10 | VDC/VC 90/10 | 28.5 | VDC/VC 90/10 | 0.6 | 90/10 | 8 |
| | | | | | 80/20 | 17 |
| | | | | | 60/40 | 27 |
| Example 11 | VDC/VC 80/20 | 12.8 | VDC/VC 80/20 | 4.2 (Estimated value) | 75/25 | 11 |
| Example 12 | VDC/VC 80/20 | 5.0 | VDC/VC 80/20 | 0.5 | 90/10 | 10 |
| | | | | | 80/20 | 12 |
| | | | | | 60/40 | 21 |
| Example 13 | VDC/VC 80/20 | 5.0 | VDC/VC 80/20 | 3.5 | 90/10 | 8 |
| | | | | | 80/20 | 11 |
| | | | | | 60/40 | 13 |
| Example 14 | VDC/VC 80/20 | 10.0 | VDC/VC 80/20 | 8.0 | 90/10 | 9 |
| | | | | | 80/20 | 11 |
| | | | | | 60/40 | 14 |
| Example 15 | VDC/VC 80/20 | 30.0 | VDC/VC 80/20 | 8.0 | 60/40 | 28 |
| Example 16 | VDC/VC 80/20 | 30.0 | VDC/VC 80/20 | 0.5 | 60/40 | 15 |
| Example 17 | VDC/VC 80/20 | 12.8 | VDC/VC 80/20 | 4.2 | 90/10 | 83 |
| | | | | | 80/20 | 89 |
| | | | | | 60/40 | 90 |
| Example 18 | VDC/VC 80/20 | 12.8 | VDC/VC 80/20 | 4.2 | 90/10 | 78 |
| | | | | | 80/20 | 82 |
| | | | | | 60/40 | 88 |

| | PVDC-A | | PVDC-B | | PVDC-A/PVDC-B | |
|---|---|---|---|---|---|---|
| Example No. | Charge composition (VDC/VC wt %) | Mw ($10^4$) | Charge composition (VDC/VC wt %) | Mw ($10^4$) | Composite ratio (wt %) | Oxygen permeability (*) |
| Comparative Example 1 | 90/10 | 9.8 | 90/10 | 1.2 | 99/1 | Film unformable |
| Comparative Example 2 | 90/10 | 9.8 | 90/10 | 1.2 | 40/60 | 18 |
| Comparative Example 3 | 99.5/0.5 | Unmeasurable | 90/10 | 1.2 | 80/20 | Film unformable |
| Comparative Example 4 | 40/60 | 8.5 | 90/10 | 1.2 | 80/20 | 58 |
| Comparative Example 5 | 90/10 | 3.9 | 90/10 | 1.2 | 80/20 | 5 |
| Comparative Example 6 | 90/10 | 33.0 | 90/10 | 0.6 | 60/40 | Film unformable |
| Comparative Example 7 | 90/10 | 9.8 | 99.5/0.5 | Unmeasurable | 80/20 | Film unformable |
| Comparative Example 8 | 90/10 | 9.8 | 40/60 | 0.9 | 80/20 | 62 |
| Comparative Example 9 | 90/10 | 9.8 | 90/10 | 0.38 | 80/20 | 6 |
| Comparative Example 10 | 90/10 | 28.5 | 90/10 | 8.5 | 80/20 | Film unformable |
| Comparative Example 11 | 90/10 | 9.8 | 90/10 | 9.6 | 80/20 | Film unformable |
| Comparative Example 12 | 80/20 | 12.8 | — | — | DBS 2.0 | Film unformable |
| | | | | | DBS 4.0 | 320 |
| | | | | | DBS 6.0 | 706 |
| Comparative Example 13 | 80/20 | 12.8 | — | — | ATBC 2.0 | Film unformable |
| | | | | | ATBC 4.0 | 108 |
| | | | | | ATBC 6.0 | 237 |

| Water vapor permeability | Olive oil extraction | Tensile strength | Apparent melt viscosity | High-frequency sealability |
|---|---|---|---|---|

TABLE 1-continued

| Example No. | (+) | (mg/dm²) | (kg/mm²) | (Poise) | (sec) |
|---|---|---|---|---|---|
| Example 1 | 18 | 0.5 | 9.2 | 5200 | 1800≦ |
|  | 32 | 0.6 | 11.2 | 3500 | 1800≦ |
|  | 45 | 0.8 | 8.9 | 2900 | 1800≦ |
| Example 2 | 19 | 0.4 | 8.8 | 4200 | 1800≦ |
|  | 38 | 0.8 | 9.1 | 3400 | 1800≦ |
|  | 52 | 0.9 | 10.1 | 2000 | 1800≦ |
| Example 3 | 19 | 0.4 | 9.8 | 4500 | 1800≦ |
|  | 38 | 0.3 | 10.2 | 3500 | 1800≦ |
|  | 49 | 0.9 | 11.3 | 2900 | 1800≦ |
| Example 4 | 10 | 0.1 | 8.8 | 5100 | 1800≦ |
|  | 21 | 0.2 | 8.2 | 3800 | 1800≦ |
|  | 29 | 0.4 | 10.2 | 2700 | 1800≦ |
| Example 5 | 8 | 0.2 | 10.0 | 4900 | 1800≦ |
|  | 19 | 0.4 | 9.9 | 3700 | 1800≦ |
|  | 28 | 0.5 | 10.3 | 2600 | 1800≦ |
| Example 6 | 45 | 0.6 | 12.2 | 3500 | 1800≦ |
| Example 7 | 21 | 0.1 | 12.3 | 9700 | 1800≦ |
|  | 29 | 0.1 | 11.5 | 4200 | 1800≦ |
|  | 33 | 0.1 | 10.9 | 1500 | 1800≦ |
| Example 8 | 11 | 0.1 | 11.9 | 8200 | 1800≦ |
|  | 18 | 0.1 | 11.5 | 3800 | 1800≦ |
|  | 21 | 0.2 | 11.8 | 1700 | 1800≦ |
| Example 9 | 19 | 0.1 | 15.8 | 12500 | 1800≦ |
|  | 22 | 0.1 | 15.2 | 5600 | 1800≦ |
|  | 29 | 0.1 | 14.8 | 2700 | 1800≦ |
| Example 10 | 31 | 0.2 | 13.1 | 9200 | 1800≦ |
|  | 38 | 0.4 | 12.9 | 6500 | 1800≦ |
|  | 48 | 0.4 | 12.8 | 3200 | 1800≦ |
| Example 11 | 31 | 0.1 | 11.3 | 3700 | 1800≦ |
| Example 12 | 19 | 0.5 | 5.2 | 2800 | 1800≦ |
|  | 38 | 0.6 | 4.9 | 1200 | 1800≦ |
|  | 49 | 0.9 | 4.5 | 590 | 1800≦ |
| Example 13 | 20 | 0.2 | 9.5 | 6200 | 1800≦ |
|  | 29 | 0.3 | 9.9 | 2900 | 1800≦ |
|  | 34 | 0.3 | 8.7 | 950 | 1800≦ |
| Example 14 | 21 | 0.1 | 13.5 | 37000 | 1800≦ |
|  | 29 | 0.1 | 11.6 | 21000 | 1800≦ |
|  | 33 | 0.1 | 11.7 | 15000 | 1800≦ |
| Example 15 | 52 | 0.1 | 15.9 | 26000 | 1800≦ |
| Example 16 | 38 | — | 11.8 | 4300 | 1800≦ |
| Example 17 | 88 | 1.2 | 11.9 | 4300 | 1800≦ |
|  | 92 | 1.2 | 10.8 | 2200 | 1800≦ |
|  | 98 | 1.3 | 11.3 | 1100 | 1800≦ |
| Example 18 | 80 | 1.2 | 11.4 | 4400 | 1800≦ |
|  | 88 | 1.2 | 11.3 | 2400 | 1800≦ |
|  | 94 | 1.3 | 10.9 | 1200 | 1800≦ |
| Comparable Example 1 |  | Film unformable |  | 79000 | Film unformable |
| Comparable Example 2 | 41 | 0.9 | 1.1 | 1200 | 1≧ |
| Comparable Example 3 |  | Film unformable |  | Does not flow | Film unformable |
| Comparable Example 4 | 112 | 0.9 | 9.2 | 3300 | 1800≦ |
| Comparable Example 5 | 18 | 0.4 | 1.2 | 900 | 1≧ |
| Comparable Example 6 |  | Film unformable |  | Does not flow | Film unformable |
| Comparable Example 7 |  | Film unformable |  | Does not flow | Film unformable |
| Comparable Example 8 | 138 | 0.7 | 9.8 | 2800 | 1800≦ |
| Comparable Example 9 | 21 | 0.8 | 1.5 | 850 | 1≧ |
| Comparable Example 10 |  | Film unformable |  | Does not flow | Film unformable |
| Comparable Example 11 |  | Film unformable |  | 88000 | Film unformable |
| Comparable Example 12 |  | Film unformable |  | 52000 | Film unformable |
|  | 147 | 4.2 | 7.8 | 12000 | 1800≦ |
|  | 232 | 7.2 | 8.0 | 3200 | 1800≦ |
| Comparable Example 13 |  | Film unformable |  | 58000 | Film unformable |
|  | 144 | 2.1 | 10.2 | 16000 | 1800≦ |
|  | 197 | 3.8 | 8.7 | 4200 | 1800≦ |

Note:
*: cc · μm/m² · day · atm at 20° C.-100% RH
+: g · μm/m² · day · atm at 40° C.-90% RH

Industrial Applicability

The present invention provides a vinylidene chloride copolymer composition that is a composite vinylidene chloride copolymer composition which comprises two kinds of vinylidene chloride-based polymers different in average molecular weight, namely, a polymer A having a larger average molecular weight used as a mechanical strength imparting component and a high frequency sealing component and a polymer B having a smaller average molecular weight used as a plasticizer that is effective at the time of processing, and which can be easily processed with addition of utterly no liquid plasticizer or a much smaller amount of liquid plasticizer than in the prior art, and a monolayer film obtained therefrom.

Accordingly, as compared with monolayer films obtained from previous vinylidene chloride copolymer compositions in which the addition of a liquid plasticizer is indispensable, the present monolayer film is excellent in barrier property and non-extractability by oily foods and hence is suitable as a packaging material and wrapping film that require good barrier property used for ham, sausage, daily dishes and other like foods.

We claim:

1. A composite vinylidene chloride copolymer composition which comprises a vinylidene chloride copolymer A having a vinylidene chloride content of not less than 50% by weight and not more than 99% by weight and a weight average molecular weight of not less than 50,000 and not more than 300,000 as determined by gel permeation chromatography and a vinylidene chloride copolymer B having a vinylidene chloride content of not less than 50% by weight and not more than 99% by weight and a weight average molecular weight of not less than 5,000 and not more than the smaller one of either 0.8 times the weight average molecular weight of the vinylidene chloride copolymer A or 80,000 as determined by gel permeation chromatography, and which contains the copolymer A in an amount of not less than 50% by weight and not more than 98% by weight.

2. The composite vinylidene chloride copolymer composition according to claim 1 wherein the weight average molecular weight of the vinylidene chloride copolymer A, MwA, and the weight average molecular weight of the vinylidene chloride copolymer B, MwB, satisfy the following equations (1), (2) and (3):

$$50,000 \leq MwA \leq 300,000 \tag{1}$$

when $MwA \geq 100,000$ $$5,000 \leq MwB \leq 80,000 \tag{2}$$

when $MwA \leq 100,000$ $$5,000 j\, MwB \leq 0.8 \times MwA \tag{3}$$

3. A monolayer film comprising the composite vinylidene chloride copolymer composition according to claim 1.

* * * * *

UNITED STATES PATENT AND TRADEMARK OFFICE
CERTIFICATE OF CORRECTION

PATENT NO. : 5,446,101
DATED : August 29, 1995
INVENTOR(S) : ANAZAWA et al

It is certified that error appears in the above-indentified patent and that said Letters Patent is hereby corrected as shown below:

On the cover page, Item [22], filed "Oct. 18, 1994" should read -- PCT Filed March 3, 1994--.

On the cover page, after Item [22], the following should be inserted:

```
--[86] PCT No.:          PCT/JP94/00340
   §371 DATE:            October 18, 1994
   §102(e) Date:         October 18, 1994
   [87] PCT Pub. No.: WO 94/20572 --.
```

Signed and Sealed this

Seventeenth Day of September, 1996

Attest:

BRUCE LEHMAN

Attesting Officer    Commissioner of Patents and Trademarks